Oct. 24, 1950     C. R. BACCA     2,526,721
MASTER CYLINDER WITH AUXILIARY
CYLINDER AND FLOATING PISTON
Filed April 23, 1947
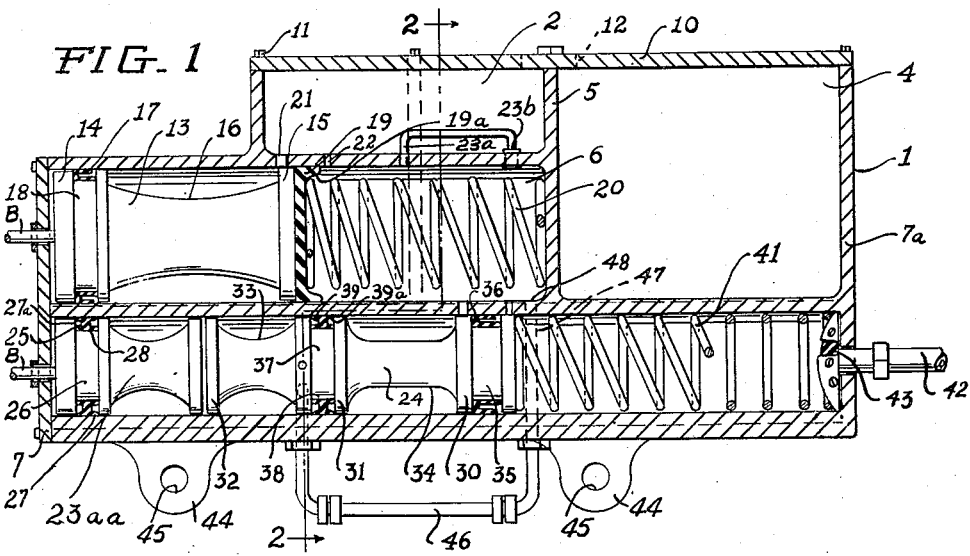
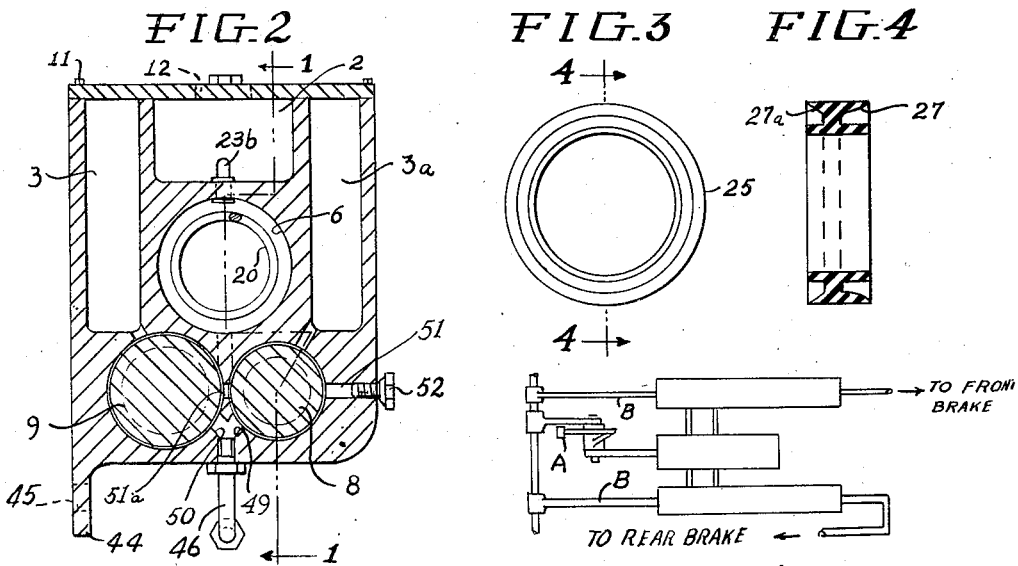
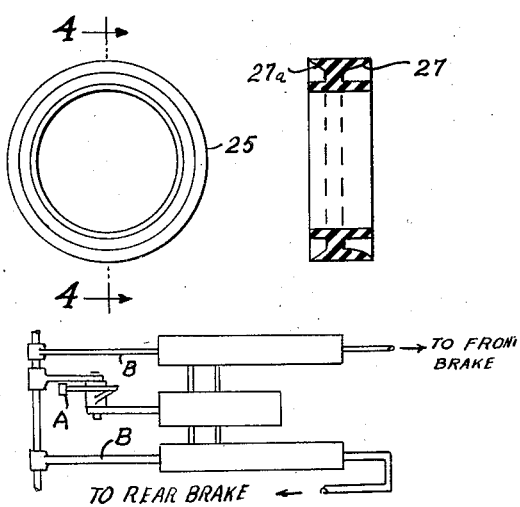
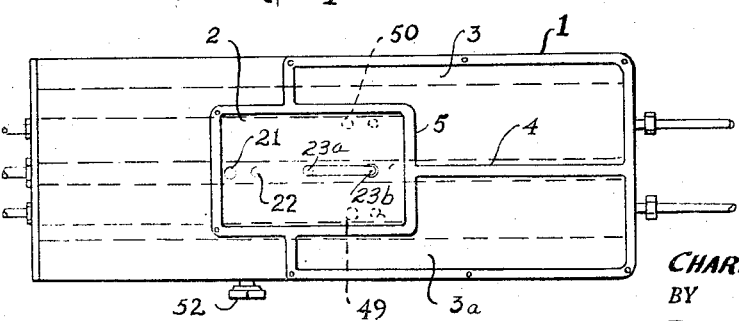
INVENTOR.
CHARLES R BACCA
BY
Albert H. Robinson
HIS ATTORNEY Patented Oct. 24, 1950

2,526,721

UNITED STATES PATENT OFFICE 2,526,721

MASTER CYLINDER WITH AUXILIARY CYLINDER AND FLOATING PISTON

Charles R. Bacca, New Richmond, Ohio

Application April 23, 1947, Serial No. 743,319

10 Claims. (Cl. 60—54.5)

This invention relates to a fluid or hydraulic pressure device for distributing pressure to a plurality of selected points supplied from a single hydraulic pressure distributing pressure source, and with auxiliary cylinders supplementing a master cylinder.

The device comprises a master cylinder and an auxiliary cylinder or cylinders interconnected for fluid pressure being applied from the master piston to the auxiliary pistons until the brakes are worn to a certain point of adjustment whereas beyond that point the auxiliary pistons are actuated directly from the brake pedal. A common means manually actuates the pistons in all the cylinders under certain conditions at the end of the cycle stroke of the master piston whereas for a predetermined proportion of the begining of the cycle stroke of the master piston, the auxiliary pistons are actuated by pressure from the master cylinder.

The master cylinder is constructed so that hydraulic pressure is built up only for the first part of the master piston stroke for hydraulic operation of the auxiliary pistons but is released for the rest of the piston stroke. This obviates false feeling of pressure to the brakes after the brake shoes have become nearly worn to their full adjustment, and causes direct hydraulic pressure, beyond this point, from the auxiliary cylinders rather than the master cylinder. The operator is thereby warned of the degree of wear to which the brakes have been worn and how much adjustability remains before the brakes are completely worn out.

Furthermore, the direct manual operation of the auxiliary pistons in addition to their fluid pressure operation assures their operation under all conditions independently of each other and of the master piston. Thus, failure of operation of one cylinder does not render either of the other cylinders inoperative.

While the invention is adapted for use with all types of hydraulic systems for distributing pressure to a plurality of points without the distribution of pressure at one point being affected by distribution to another, it is especially adapted for use with hydraulic brakes, and more particularly with hydraulic brakes on motor vehicles.

Generally described, the invention comprises an hydraulic unit or system comprising a master cylinder and a plurality of auxiliary cylinders, said cylinders being connected with a fluid supply conduit. The system for applying pressure to the brakes is entirely hydraulic with the master piston equal in fluid displacement to the per unit of travel to that of the auxiliary pistons combined. For a certain distance before the fluid displacement of the auxiliary pistons is initiated, all pistons are manually actuated together as a unit and for equal distance. Each of the auxiliary pistons is composed of disconnected sections which are provided with double-acting seals to seal the pressure chamber between the sections of the pistons. As a result of the double-acting seals, there is no leakage from the pressure chamber to permit a vacuum being built up to siphon off any fluid from said pressure chamber.

For a better understanding of the invention, reference is made to the accompanying drawing in which:

Fig. 1 is a longitudinal cross-section on lines 1—1 of Fig. 2 of a unit embodying the invention;

Fig. 2 is a cross-sectional view of lines 2—2 of Fig. 1;

Fig. 3 is a side elevation of the double-acting seal;

Fig. 4 is a cross-sectional view of lines 4—4 of Fig. 3;

Fig. 5 is a top plan view of the unit with the cover removed; and

Fig. 6 is a diagrammatic view of the unit and braking pedal.

Referring specifically to the drawing in which like numerals are used to designate like parts, numeral 1 is a casing having provided therein a top chamber 2 and two side chambers 3 and 3a on one end and each side of the top chamber. Chambers 3 and 3a are separated by a wall or web 4 disposed at a right angle to the web or wall 5. There is also provided in the casing a master cylinder 6, this being preferably located beneath the top chamber 2 and between portions of the side chambers 3 and 3a which extend from end walls 7 and 7a of the casing. Two auxiliary cylinders 8 and 9 are provided beneath the master cylinder. These auxiliary chambers are preferably of different diameters in order to properly proportion the pressure and to cause proper fluid displacement to be exerted at the different points of distribution.

All of the chambers 2, 3 and 3a open at the top of the casing and are conveniently closed by a common cover 10 fitting on the top edges of the dividing webs or walls and the side walls of the casing, and are secured thereto by any suitable fastening means 11, such as bolts. The chambers are filled with a fluid for operating the hydraulic system, and removable plug 12 is provided advantageously in the cover allowing a fluid supply to be poured into the chambers without removing the cover. The plug is conveniently positioned over the juncture of the dividing webs or walls 4 and 5 so that the fluid can be poured into all the chambers through the same opening.

There is a reciprocable piston 13 within the master cylinder having head portions 14 and 15 on the ends of an intervening body portion 16 of reduced diameter. An annular retainer seal 17 is mounted on the head portion 14 in an anular groove 18. The retainer seal is U-shaped with two flexible lips which are expanded apart by the inherent resilient character of the seal. The end of the piston 13, opposite to the pressure end, is connected to a foot pedal A by a connecting rod B that projects through the wall of the casing 1.

A pressure cup 19 seats on one end of the piston, said cup having a flexible flange or lip 19a to contact with the wall of the cylinder. A coiled spring 20 is interposed in the cylinder with one end seated against the end wall of the cylinder and the other end of the spring seated against the pressure cup for retaining the piston in normal position. Fluid ports 21 and 22 are formed in the web or wall of the container between the reservoir 2 and the master cylinder. The pressure cup and retainer seals are of suitable flexible material, such as rubber.

A means, such as a pressure relief device or fluid by-pass 23, is provided for the master cylinder so that pressure will be released after the master piston has moved a certain distance, slightly less than half the length of the master cylinder. This pressure release device is such that further pressure fluid will be by-passed behind the piston into reservoir 2 after the master piston has moved to a distance proportioned to about 90 per cent of the full adjustment of the brakes. This is preferably slightly less than one-half the stroke of the master piston. Ninety per cent (90%) of the full adjustment is accomplished by the fluid being displaced from the master cylinder to the pressure chamber in the auxiliary cylinders between seals 25 and 38 hereinafter referred to. The last 10% of the full adjustment is accomplished by manual operation direct from the foot pedal after the pressure fluid is released through the pressure relief device.

Pistons 23aa and 24 are placed in end to end relation in each of the auxiliary cylinders. These two pistons are not fastened together but are separate and independent. One of these pistons, piston 23aa, is of the same general construction as master piston 13 but is of smaller diameter. A double-action seal 25 is mounted within an annular groove 26 formed in the outer head portion. This seal has oppositely disposed flexible lips 27 and 27a adjacent the outer peripheral surface and forming part of said surface for contacting with the wall of the cylinder, and oppositely disposed flexible lips 28 for contacting with the piston. Lip 27 on the pressure side is thinner and more flexible than lip 27a on the vacuum side which is thicker and at a sharper angle towards its tip end. A piston rod B also extends from the end of piston 23aa, opposite to the pressure end, through the wall of casing 1 to be operatively connected to the foot brake pedal A.

Piston 24 has spaced-apart head portions 30, 31 and 32 with reduced body portions 33 and 34 of reduced diameter therebetween. Head portion 30 has an annular groove 35 in which is mounted an annular pressure cup 36 like cup 17 in the master cylinder. Head portion 31 is provided with an annular groove 37 in which is mounted an annular double-action seal 38 similar to seal 25. It has oppositely disposed flexible lips 39 and 39a, the more flexible lip 39 being on the pressure side of the piston head and the less flexible one being on the vacuum side. The head 32 is adjacent the inner head of piston 23aa. A coiled spring 41 is interposed between the end of the piston 24 and the end wall of the cylinder.

Leading from the end of the auxiliary cylinder 8 to the rear brakes of a motor vehicle (not shown) is a conduit 42 having a two-way valve connection 43 with the auxiliary cylinder.

The construction of the mechanism within auxiliary cylinder 9 is the same as that in auxiliary cylinder 8 except that the pistons are of larger diameters to correspond with the larger diameter of the cylinder.

Extended portions 44, with perforations 45, are provided on the exterior of the casing for permitting said casing to be fastened in position on a motor vehicle or to the member with which the device is to be used.

The master cylinder is connected to the auxiliary cylinders by any suitable connection, such as a conduit pipe line 46. One end 47 of the conduit 46 connects with the master cylinder at point 48, and the other end of the conduit diverges at points 49 and 50 for connection with each of the auxiliary cylinders. The connection at points 49 and 50 are preferably just back of the seals 38.

A port 51 is provided in one of the auxiliary cylinders, and these auxiliary cylinders are connected by a port 51a so that any air can be bled from the auxiliary cylinders. The bleed port 51 is closed by a bleed screw 52. Should either of two line connections break, any air getting into the system can be bled out by loosening the screw.

The front brake cylinders of a motor vehicle ordinarily are larger than the rear brake cylinders, and thus the auxiliary cylinder leading to the front or larger brake cylinder may be larger so that greater pressure may be exerted upon them and the proper proportion of fluid fed thereto.

Since the pistons 24 are separate and independent from pistons 23aa in the auxiliary cylinders, the pistons 24 are actuated by fluid pressure, which is built up between said pistons by fluid forced into the pressure chamber through conduit 46 by the master piston, or manually if the fluid pressure in said chamber is not built up between the pistons 23aa and 24. Manual operation results because the ends of piston 23aa can abut against the ends of pistons 24 when said pistons 24 are not actuated by fluid pressure. This is because pistons 23aa are at all times manually operated by the brake pedal as is the master piston.

In the operation of the device, the master piston and each of the auxiliary pistons will, upon pressing down the foot pedal, actuate all of the pistons from normal position (as shown in Fig. 1) against the springs. The fluid port 22 in the master cylinder from the top reservoir is first closed on the compression side of the master piston to force the fluid therefrom through the pilot conduit line to the auxiliary cylinders behind seals 38 and build up a pressure between pressure seals 25 and 38 to actuate pistons 24. Upon continued movement of the master piston, after the brakes become about 90% worn, pressure is released through the pressure release device back to the reservoir to avoid false feeling of pressure to the brakes after the brakes are worn beyond a certain amount. The pressure is released through the opening 23a in the pressure relief device after the piston head 15 and seal 19 of the master cylinder move past said opening so that pressure fluid from the master cylinder is by-passed through opening 23a in back of the piston head from the opposite opening 23b of the pressure relief device which is in front of the piston head. There is no hydraulic pressure from the master cylinder to the auxiliary cylinders after the master piston head moves past the opening 23a of the pressure relief device. Pistons 24 in the auxiliary cylinders will then act as a unit to exert pressure on the brakes. They function to exert pressure on the brakes from the last 10 per cent of the brake adjustment whereas the first 90 per cent is by the master piston. These pistons 24 in the auxiliary cylinders travel, when actuated by fluid pressure from the master cylinder, twice as far as do the master piston, being so proportioned in size as to obtain this ratio of movement when actuated by fluid pressure.

The full pressure stroke of the master piston 13 is about one-half the length of the master cylinder from its normal position as shown in Fig. 1 to slightly past the opening 23a of the pressure release device. The length of the auxiliary cylinder from the end of piston 24, in its normal position as shown in Fig. 1, is substantially longer than one-half the stroke of the master piston to allow for the longer distance of travel for the auxiliary piston. It should be of sufficient length to permit the stroke of the auxiliary piston to be twice that of the movement of the master piston. Since the master piston moves some distance past the opening 23a, its entire pressure stroke being only about one-half the length of the cylinder from the normal position of said piston, the length of the auxiliary cylinder, would need to be, from the end of the auxiliary piston in its normal position, about the length of the master cylinder or somewhat longer as it is shown to be in Fig. 1.

When pressure from the foot brake pedal is released, the springs 20 and 41 return, respectively, the master and auxiliary pistons to their normal positions as shown in Fig. 1. However, while pressure is exerted by the brake pedal, piston 13 is being moved an equal distance with piston 23aa, and piston 24 will move out of contact with the end of piston 23aa since it moves twice the distance as piston 23aa when subjected to hydraulic pressure. Upon release of hydraulic pressure, when the master piston moves past the opening 23a of the pressure relief device, the spring 41 will move piston 24 into contact with the end of piston 23aa so that any further movement of piston 24 will be directly from piston 23aa. Then, too, the follower piston 23aa is being moved forward so that it catches up with piston 24 or piston 24 would be moved back to contact it. This further movement of piston 23aa is, of course, at equal distance with the movement of the piston 13 since it is then moved manually and not hydraulically.

If one of the connecting lines to the distribution point is broken or rendered inoperative, it will not affect the operation of the other line. A break in one line will only affect the brakes connected to that line. The break in one line does not affect the other line and hence both lines are not rendered ineffective by a break in one of the lines. Failure of the master cylinder seal would not render inoperative the auxiliary cylinders or either one of them.

The auxiliary pistons, after being actuated a certain distance by fluid pressure from the master cylinder, will be continued in their cycle of movement directly by the foot pedal which actuates the auxiliary pistons as well as the master piston.

The double-action seals are especially advantageous in that they completely seal the pressure chamber between the auxiliary pistons and prevent any leeakage which would siphon off the fluid from the pressure side of the cylinder back into the fluid supply chambers, or air past the seal 25 into the pressure chamber.

While one preferred embodiment has been illustrated and described in detail for carrying the invention into effect, it will be understood that there may be various changes in the details of construction without departing from the spirit of the invention.

I claim:

1. A fluid pressure producing device comprising a master cylinder and an auxiliary cylinder, a reciprocable piston in each of the cylinders, a safety device associated with the master cylinder for by-passing pressure fluid, contained within the master cylinder, near the end of the master piston pressure stroke, means for feeding from the master cylinder the pressure fluid to the auxiliary cylinder to operate hydraulically the auxiliary piston during the master piston pressure stroke until the pressure fluid is by-passed, manual means for actuating the master piston, said manual means for the master piston being also common to the auxiliary piston for actuating it whenever said auxiliary piston is not hydraulically operated, and spring means for returning the pistons to normal position.

2. A fluid pressure producing device as set forth in claim 1 in which there are a plurality of auxiliary cylinders and pistons and the manual means is common to the master and auxiliary pistons.

3. A fluid pressure producing device as set forth in claim 2 in which the auxiliary pistons have a combined cross-sectional area equal in fluid displacement to the cross-sectional area of the master piston.

4. A fluid pressure producing device as set forth in claim 1 in which the auxiliary piston in the auxiliary cylinder is in separate sections and there is a sealed chamber between said sections to which the fluid pressure is fed from the master cylinder.

5. A fluid pressure producing device as set forth in claim 2 in which each of the auxiliary pistons is in separate sections and there is a sealed pressure chamber between said sections to which the pressure fluid is fed from the master cylinder.

6. A fluid pressure producing device as set forth in claim 5 in which a fluid supply reservoir is connected to each of the cylinders.

7. A fluid pressure producing device comprising a master cylinder and an auxiliary cylinder, a reciprocating piston in each of the cylinders, a fluid supply reservoir connected to each of the cylinders, a safety device associated with the master cylinder for by-passing pressure fluid, contained within the master cylinder, near the end of the master piston pressure stroke, means for feeding the pressure fluid from the master cylinder to the auxiliary cylinder to operate hydraulically the auxiliary piston during the master piston pressure stroke until the pressure fluid is by-passed, manual means for actuating the master piston, said manual means for the master piston being also common to the auxiliary piston for actuating it whenever said auxiliary piston is not hydraulically operated, and spring means for returning the pistons to normal position.

8. A fluid pressure producing device as set forth in claim 7 in which each cylinder has a separate fluid supply reservoir connected thereto.

9. A fluid pressure producing device as set forth in claim 8 in which there are a plurality of auxiliary cylinders and pistons, and the manual means is common to the master and auxiliary pistons.

10. A fluid pressure producing device as set forth in claim 9 in which the auxiliary pistons are in separate sections and there is a sealed chamber between said sections to which the fluid pressure is fed from the master cylinder.

CHARLES R. BACCA.

REFERENCES CITED

The following references are of record in the file of this patent:

UNITED STATES PATENTS

| Number | Name | Date |
|---|---|---|
| 1,457,156 | Frock | May 29, 1923 |
| 1,897,230 | Bowen | Feb. 14, 1933 |
| 1,986,763 | Rhodes | Jan. 1, 1935 |
| 2,115,995 | McInnerney | May 3, 1938 |
| 2,119,001 | Bachmann | May 31, 1938 |
| 2,124,363 | Bertrand | July 19, 1938 |
| 2,249,227 | Press | July 15, 1941 |
| 2,285,703 | Foster | June 9, 1942 |